United States Patent
Herwig et al.

(10) Patent No.: US 7,628,121 B2
(45) Date of Patent: Dec. 8, 2009

(54) APPARATUS AND PROCESS FOR COOLING HOT GAS

(75) Inventors: Uwe Herwig, Gummersbach (DE); TeckSoon Lau, Amsterdam (NL); Franciscus Johanna Arnoldus Martens, Amsterdam (NL); Manfred Heinrich Schmitz-Goeb, Gummersbach (DE)

(73) Assignee: Shell Oil Company, Houston, TX (US)

( * ) Notice: Subject to any disclaimer, the term of this patent is extended or adjusted under 35 U.S.C. 154(b) by 426 days.

(21) Appl. No.: 11/734,177

(22) Filed: Apr. 11, 2007

(65) Prior Publication Data

US 2007/0267171 A1  Nov. 22, 2007

(30) Foreign Application Priority Data

Apr. 12, 2006  (EP)  .................................. 06112523

(51) Int. Cl.
 *F24H 1/00*  (2006.01)
(52) U.S. Cl. ...................... 122/31.1; 122/7 R; 122/15.1; 122/18.1; 165/164
(58) Field of Classification Search ................ 122/18.1, 122/15.1, 31.1, 7 R, 20 R; 62/304, 306, 309, 62/407, 412, 415; 165/157, 158, 163, 164, 165/168
See application file for complete search history.

(56) References Cited

U.S. PATENT DOCUMENTS

| | | | | |
|---|---|---|---|---|
| 1,959,933 | A * | 5/1934 | Simsohn | 122/14.22 |
| 2,530,799 | A * | 11/1950 | Arvintz et al. | 392/495 |
| 3,570,458 | A | 3/1971 | Yokkaichi et al. | 122/34 |
| 3,610,329 | A | 10/1971 | Limburgerhof et al. | 165/142 |
| 3,802,497 | A | 4/1974 | Kummel et al. | 165/158 |
| 3,828,847 | A * | 8/1974 | Stein | 165/76 |
| 4,029,054 | A | 6/1977 | Schuurman | 122/7 |
| 4,220,200 | A * | 9/1980 | Weber | 165/142 |
| 4,462,339 | A | 7/1984 | Jahnke et al. | 122/7 R |

(Continued)

FOREIGN PATENT DOCUMENTS

DE  4404068  8/1995

(Continued)

OTHER PUBLICATIONS

Oil and Gas Journal, Sep. 6, 1971, pp. 85-90.

*Primary Examiner*—Gregory A Wilson

(57) ABSTRACT

An apparatus for cooling hot gas comprises:
(i) a vertical elongated vessel provided with a cooling medium compartment comprising in use a first cooling medium, an inlet to supply fresh first cooling medium and a outlet for discharge of used first cooling medium, the vessel further provided with an inlet for hot gas and an outlet for cooled gas, at least one heat exchange tube, which heat exchange tube is positioned in the cooling medium compartment (and fluidly connects the inlet for hot gas and the outlet for cooled gas,
(ii) said cooling medium compartment further comprising a vertical and centrally positioned open ended downcomer wherein said heat exchange tube is positioned in a space between the downcomer and the vessel wall,
(iii) and wherein the heat exchanger tube is mounted at its upstream end in a tube plate and wherein the tube plate is provided with means to supply a second cooling medium to the exterior of the upstream end of the heat exchanger tube, means to discharge the used second cooling medium, means to reduce the temperature of the used second cooling medium and means to recycle the second cooling medium to the exterior of the upstream end of the heat exchanger tube.

13 Claims, 4 Drawing Sheets

U.S. PATENT DOCUMENTS

| | | | |
|---|---|---|---|
| 4,589,473 A | 5/1986 | Kehrer | 165/1 |
| 4,662,339 A | 5/1987 | Hotate et al. | 123/486 |
| 4,721,065 A * | 1/1988 | Mohrenstecher et al. | 122/7 R |
| 4,732,590 A * | 3/1988 | McNeil | 96/419 |
| 5,671,807 A | 9/1997 | Lameris | 165/134 |
| 6,152,086 A * | 11/2000 | Brouwer et al. | 122/249 |
| 6,766,772 B2 | 7/2004 | Van Dongen et al. | 122/20 |
| 6,886,501 B2 | 5/2005 | Bosch et al. | 122/20 |
| 7,552,701 B2 * | 6/2009 | Brinkmann et al. | 122/31.1 |
| 2005/0287053 A1 | 12/2005 | Sakai et al. | 422/196 |
| 2008/0149316 A1 * | 6/2008 | Friese et al. | 165/163 |

FOREIGN PATENT DOCUMENTS

| | | |
|---|---|---|
| EP | 0094097 | 11/1983 |
| EP | 257719 | 3/1988 |
| EP | 291111 | 11/1988 |
| EP | 774103 | 5/1997 |
| EP | 0777098 | 6/1997 |
| EP | 1219892 | 7/2002 |
| FR | 2284851 | 5/1976 |
| GB | 1336716 | 11/1973 |
| WO | WO9306041 | 4/1993 |
| WO | WO9603345 | 2/1996 |
| WO | WO9639354 | 12/1996 |
| WO | WO9722547 | 6/1997 |
| WO | WO2005015105 | 2/2005 |
| WO | WO2005116560 | 12/2005 |

\* cited by examiner

APPARATUS AND PROCESS FOR COOLING HOT GAS

This application claims the benefit of European Patent Application No. 06112523.3 filed Apr. 12, 2006, which is incorporated herein by reference.

FIELD OF THE INVENTION

The invention relates to an apparatus and process for cooling hot gas which apparatus comprises a vessel provided with one or more heat exchanging tubes, the hot gas flowing through the said tube(s) and a cooling medium (e.g. water) flowing around the said tubes and the tubes being mounted at least at one end in a tube plate.

BACKGROUND OF THE INVENTION

Heat exchange devices are used on a large scale in many branches of industry, e.g. in the petroleum industry for cooling products obtained from hydrocrackers and reactors for partial oxidation of (hydro)carbon-containing fuels such as oil and coal and the like.

When used for cooling purposes, the hot gases are passed through tubes which are cooled with a cooling medium on the outside. The walls of the tubes acquire a high temperature owing to transfer of heat from the hot gases to the tube metal which heat is further transmitted to the cooling medium. Advantageously, for reasons of space saving, helically coiled tubes are applied.

Dependent on the field of application, technical problems of different nature are met.

For example, the cooling of hot gases obtained from the gasification of (hydro)carbon-containing fuel, in which the presence of small solid particles is unavoidable, involves serious heat transfer problems and erosion/corrosion problems.

Hot synthesis gas produced by partial oxidation of (hydro)carbon-containing fuel is generally cooled in a heat exchanger located next to the gasifier thereby producing high pressure steam. A critical area is the gas inlet of the heat exchanger where the hot synthesis gas enters the heat exchange area. The wall thickness of the inlet area is to be minimized but should be thick enough to ensure mechanical integrity based on pressure and thermal loads. The gas velocity at the inlet area should be sufficiently high to prevent fouling but on the other hand low enough to ensure sufficiently low gas side heat transfer coefficients. In particular, obtaining an optimum between fouling and velocity is desirable.

U.S. Pat. No. 4,029,054 and U.S. Pat. No. 3,610,329 disclose apparatus for cooling of hot gas wherein the upstream part of the gas tubes is positioned in refractory material. The upstream part of each gas tube is separately cooled by water supplied with a dedicated supply conduit. The used cooling water is discharged to the main cooling compartment via an annulus between the refractory material and the gas tube.

FR-A-2284851 describes an apparatus for cooling of hot gas wherein the upstream part of the gas tubes are positioned in the main cooling compartment. The gas tubes are not surrounded by an annular space. The gas inlet plate is spaced away from the wall, which wall has the same convex shape thereby defining the cooling compartment wherefrom the used cooling medium is discharged via separate conduits.

A disadvantage of the cited prior art is the complexity of the apparatus due to the existence of multiple separate supply or discharge conduits.

EP-A-774103 describes an apparatus for cooling of hot gas wherein the inlet section is cooled by passing fresh cooling medium, i.e. water, along the exterior of the upstream end of the heat exchanger tubes. The flow of water is counter-current to the flow of hot gas within the tubes.

WO-A-2005116560 describes an apparatus for cooling of hot gas wherein the inlet section is cooled by passing fresh cooling medium, i.e. water, along the exterior of the upstream end of the heat exchanger tubes. The flow of water is co-current to the flow of hot gas within the tubes.

U.S. Pat. No. 5,671,807 discloses an apparatus for cooling of hot gas wherein the inlet section is cooled by passing fresh cooling medium, i.e. water, along the exterior of the upstream end of the heat exchanger tubes. The flow of water is co-current to the flow of hot gas within the tubes.

WO-A-2005015105 describes an apparatus wherein the inlet section is cooled by using fresh liquid cooling medium and a defined part of the liquid cooling medium is present in the main cooling compartment. In this prior art apparatus, although the steam production is high, there is room for improvement in view of the high heat capacity of the hot gas to be cooled. Furthermore separate conduits for supply and/or discharge of the cooling medium for each gas tube make the design complicated, the positioning of the tubes is inconvenient for replacement in case of failure, and the proposed design does not secure the operation under high pressure, especially above 9 MPa.

SUMMARY OF THE INVENTION

The invention is directed to the following apparatus.

Apparatus for Cooling Hot Gas Comprising:

(i) a vertical elongated vessel provided with a cooling medium compartment comprising in use a first cooling medium, an inlet to supply fresh first cooling medium and a outlet for discharge of used first cooling medium, said vessel further provided with an inlet for hot gas and an outlet for cooled gas, at least one heat exchange tube, which heat exchange tube is positioned in the cooling medium compartment and fluidly connects the inlet for hot gas and the outlet for cooled gas, (ii) said cooling medium compartment is further provided with a vertical and centrally positioned open ended downcomer wherein said heat exchange tube is positioned in the space between the downcomer and the vessel wall, (iii) the heat exchanger tube is mounted at its upstream end in a tube plate and wherein the tube plate is provided with means to supply a second cooling medium to the exterior of the upstream end of the heat exchanger tube, means to discharge the used second cooling medium, means to reduce the temperature of the used second cooling medium and means to recycle the second cooling medium via means to the exterior of the upstream end of the heat exchanger tube.

The invention is also directed to the following process to prepare steam by indirect heat exchange between a hot gas and water wherein the following steps are performed (i) producing steam by indirect heat exchange between a hot gas which flows through a conduit placed in a water bath, (ii) providing fresh water to the water bath, and (iii) separately cooling the upstream end of the conduit by means of indirect heat exchange between a cooling medium and the hot gas flowing through the upstream end of the conduit resulting in a used cooling medium having a temperature greater than the cooling medium, and (iv) reducing the used cooling medium of step (iii) and recycling the cooling medium to step (iii) and wherein the temperature of the cooling medium used in step (iii) is below the temperature of the fresh water added in step (ii).

Applicants found that by cooling the upstream end of the conduits, i.e. the inlet section, independently and not by means of fresh cooling medium a more effective apparatus and cooling process is obtained. The apparatus and process makes possible that fresh cooling medium may be directly supplied to the cooling medium compartment. This is advantageous because now relatively warmer fresh cooling medium may be supplied which improves the steam production of the apparatus and process. In the prior art processes the fresh cooling medium is first used to cool the inlet section. The required temperature of this fresh cooling medium had to be relatively low to sufficiently cool the inlet section resulting in a lower steam capacity.

In the prior art processes and apparatuses the amount of cooling medium which could be used to cool the inlet section is limited by the steam production. The present process and apparatus does not have this disadvantage. Other advantages may become apparent when discussing the preferred embodiments below.

BRIEF DESCRIPTION OF THE DRAWINGS

The invention will now be described by way of example in more detail by reference to the accompanying drawings.

DETAILED DESCRIPTION OF THE DRAWINGS

Figure 1:
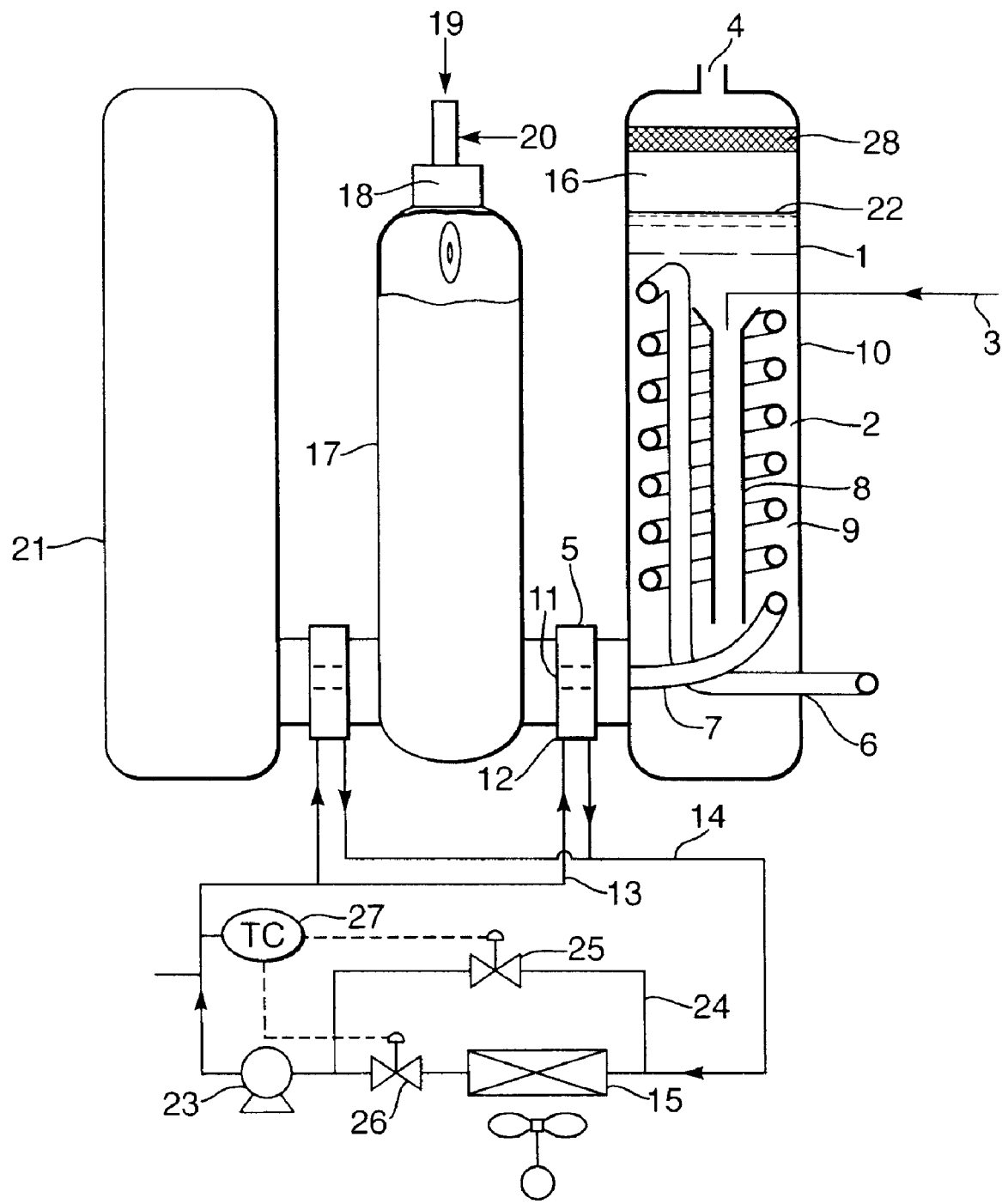
FIG. 1 illustrates two apparatuses according to the present invention in combination with one non-catalyzed partial oxidation reactor.

FIG. 1 illustrates the apparatus according to the invention in combination with a non-catalyzed partial oxidation reactor (17). The reactor (17) is provided with a burner (18) and supply conduits (19) and (20) for the hydrocarbon feed and for an oxygenate respectively. Instead of a non-catalyzed partial oxidation reactor (17), auto-thermal reforming reactors (ATR) may also be combined as the source of hot gas with the apparatus according to the invention. In FIG. 1 two apparatuses (1, 21) are shown in combination with one reactor (17). This may be advantageous when the capacity of the reactor is large and it becomes more difficult to scale up the apparatus according to the invention for cooling the large quantities of hot gas. The apparatus comprises a vertical elongated vessel (1) provided with a cooling medium compartment (2) comprising in use a first cooling medium. Also shown is an inlet (3) to supply fresh first cooling medium and an outlet (4) for discharge of used first cooling medium. If the first cooling medium is water the used cooling medium is steam. Said vessel (1) is further provided with an inlet (5) for hot gas and an outlet (6) for cooled gas. The inlet (5) and outlet (6) are fluidly connected with at least one heat exchange tube (7). Preferably more than one tube (7) run parallel between inlet (5) and outlet (6). Generally between 2 and 24 tubes (7) run parallel in compartment (2) but this number may be higher. The tubes (7) preferably are positioned in a spiral design running upwards. The outlet (6) may be positioned at the top of vessel (1) or at the bottom as shown in FIG. 1.

Optionally, a super heater module, not shown, can be positioned in vessel (1). In such a module, saturated steam as produced in the apparatus is further increased in temperature by indirect heat exchange against the hot gas. Suitable super heater modules are described in EP-A-257719, U.S. Pat. No. 6,766,772, U.S. Pat. No. 6,886,501 and EP-A-1219892.

FIG. 1 also illustrates a vertical and centrally positioned open ended downcomer (8) positioned in cooling medium compartment (2). In use, cooling medium having a relatively low temperature and thus high density will flow downwards in said downcomer. At its lower end the cooling medium will again flow upwards through the space (9) between the downcomer (8) and the vessel wall (10). In this preferably annular space (9) the cooling medium will contact the heat exchange tube (7) as positioned in said space (9) and increase in temperature. The thus heated cooling medium which will also comprise bubbles of evaporated steam, in case the heating medium is water, will have a relatively low density and will by consequence have an upwardly flow direction. Thus a circulation of cooling medium is created and enhanced because of the downcomer (8). Because fresh first cooling medium to cooling compartment (2) is added independently via inlet (3) in the apparatus according to this invention it is preferred to position said inlet (3) such that the direction of the inlet flow of fresh first cooling medium enhances, in use, a downwards flow of first cooling medium through the interior of the downcomer (8). More preferably inlet (3) is directed downwards and positioned in the upper half of the downcomer (8).

FIG. 1 also illustrates how the heat exchanger tube (7) is mounted at its upstream end (11) in a tube plate (12). Tube plate (12) needs to be cooled in order to protect said tube plate against the high temperatures of the hit gas entering the tube (s) (7). Cooling is achieved by circulating a second cooling medium to the exterior of the upstream end (11) of the heat exchanger tube (7). FIG. 1 shows how this second cooling medium is supplied via conduit (13) to the tube plate (12) and how the used cooling medium is discharged from tube plate (12) via conduit (14). The used second cooling medium is cooled to make it suitable for reuse in said cooling process. Cooling of the second cooling medium is achieved by indirect heat exchange in apparatus (15). Cooling in (15) can be achieved by cooling against air as shown or against another cooling medium for example cooling water. FIG. 1 shows a pump (23) and a temperature controller (27) which controls valves (25) and (26). By circulating more or less second cooling via by-pass conduit (24) the temperature of the second cooling medium as supplied to the tube plate (12) can be controlled and kept at the desired level.

In case the first cooling medium is water the apparatus is further provided with a mistmat (28) positioned above water level (22) in steam collecting space (16).

Figure 2:
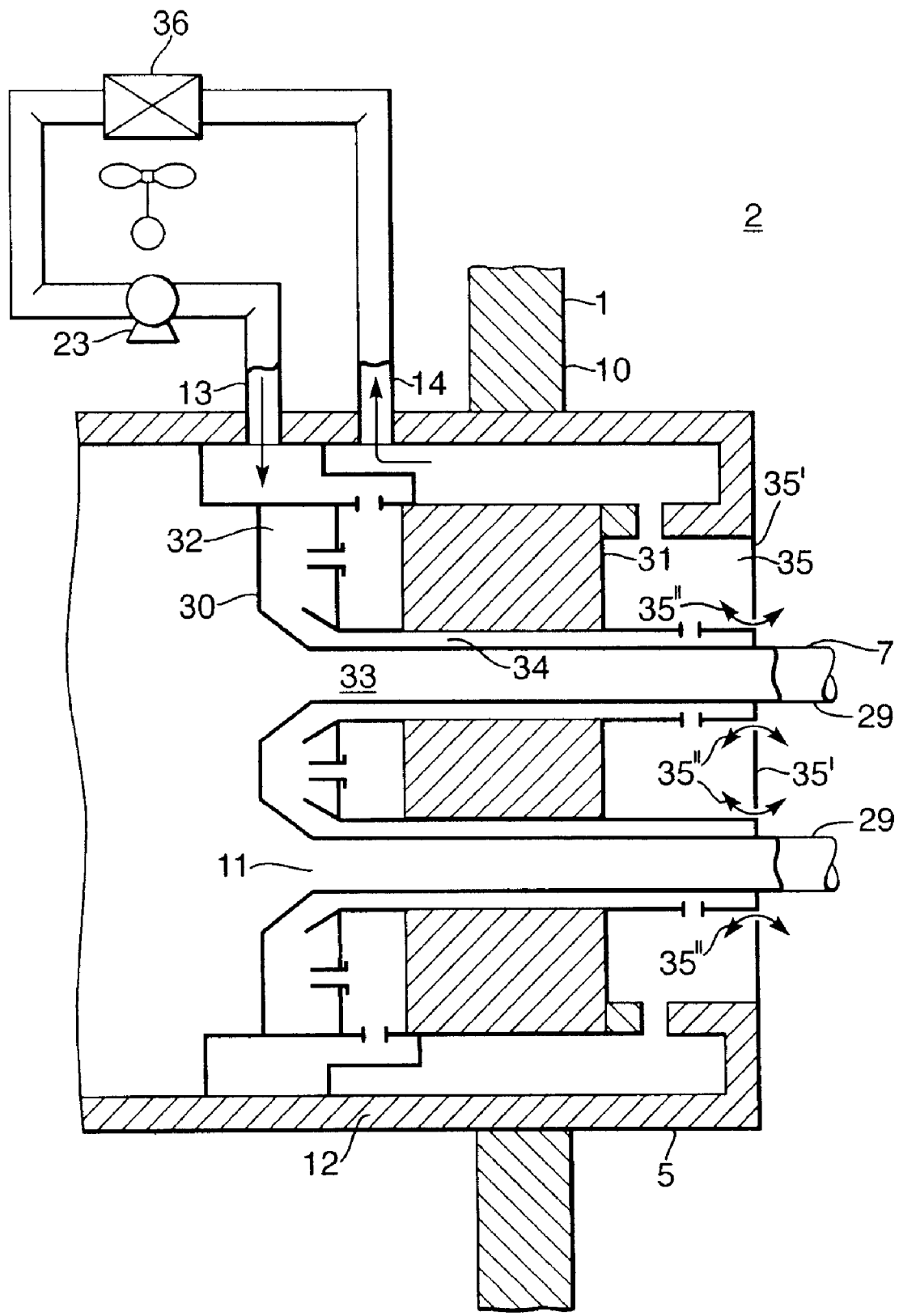
FIG. 2 illustrates a preferred embodiment of the inlet section of the apparatus according to the invention and is a cross-sectional view of BB' of FIG. 4.

FIG. 2 illustrates a preferred embodiment of the apparatus of FIG. 1. The invention is also directed to the following apparatus having an improved tube plate (12) section alone having an independent cooling. Apparatus for cooling a hot gaseous medium comprises a vessel (1) wherein a bundle (29) of a number of tubes (7) are disposed in a first coolant medium compartment (2) and wherein in use a first liquid coolant medium flows around the tube bundle (29). Tubes (7) are mounted at their upstream ends (11) in a thermal shield (30) and further extend through a support plate (31) mounted at a distance from the thermal shield (30). As shown in FIG. 2, a common front space (32) is defined between the thermal shield (30) and the support plate (31) wherein the coolant flows from the common front space (32) to each annular space

(34) of tubes (7). With a common space is meant that all annular spaces (34) are in fluid communication with one common front space (34). Means (13), preferably a conduit, to add liquid coolant to the front space (32) is present. The openings (33) in the support plate (31) are larger than the tubes (7) defining an annular space (34) between tube (7) and support plate (31). As shown in FIG. 2 a semi-isolation plate (35') is positioned spaced away from support plate (31) to define a common used cooling medium compartment (35). With a common used cooling medium compartment (35) is meant that all annular spaces (34) are in fluid communication with one used cooling medium compartment (35). The annular space (34) fluidly connects the front space (32) with the used cooling medium compartment (35) such that in use liquid coolant can flow co-current with the hot gaseous medium in the tubes (7) from the front space (32) to said used cooling medium compartment (35). Cooling medium compartment (35) is separated from first cooling medium by a semi-isolation plate (35') provided with small openings (35"). Through these openings no significant flow of cooling medium will take place apart from small flows due to fluctuating pressure differences which may occur between the two cooling medium compartments (35) and (2). Also present are means (14), preferably a conduit, to discharge the cooling medium from the used cooling medium compartment (35) to a heat exchanger (36) positioned externally from vessel (1). Heat exchanger (36) will, in use, reduce the temperature of the used cooling medium. The heat exchanger (36) is fluidly connected to the means (13) to recycle coolant to front space (32) such that, in use, cooling medium can circulate between heat exchanger (36) and front space (32). The design of upstream end (11) and thermal shield (30) may be as described in FIG. 2 of WO-A-2005116560, which publication is hereby incorporated by reference.

Figure 3:
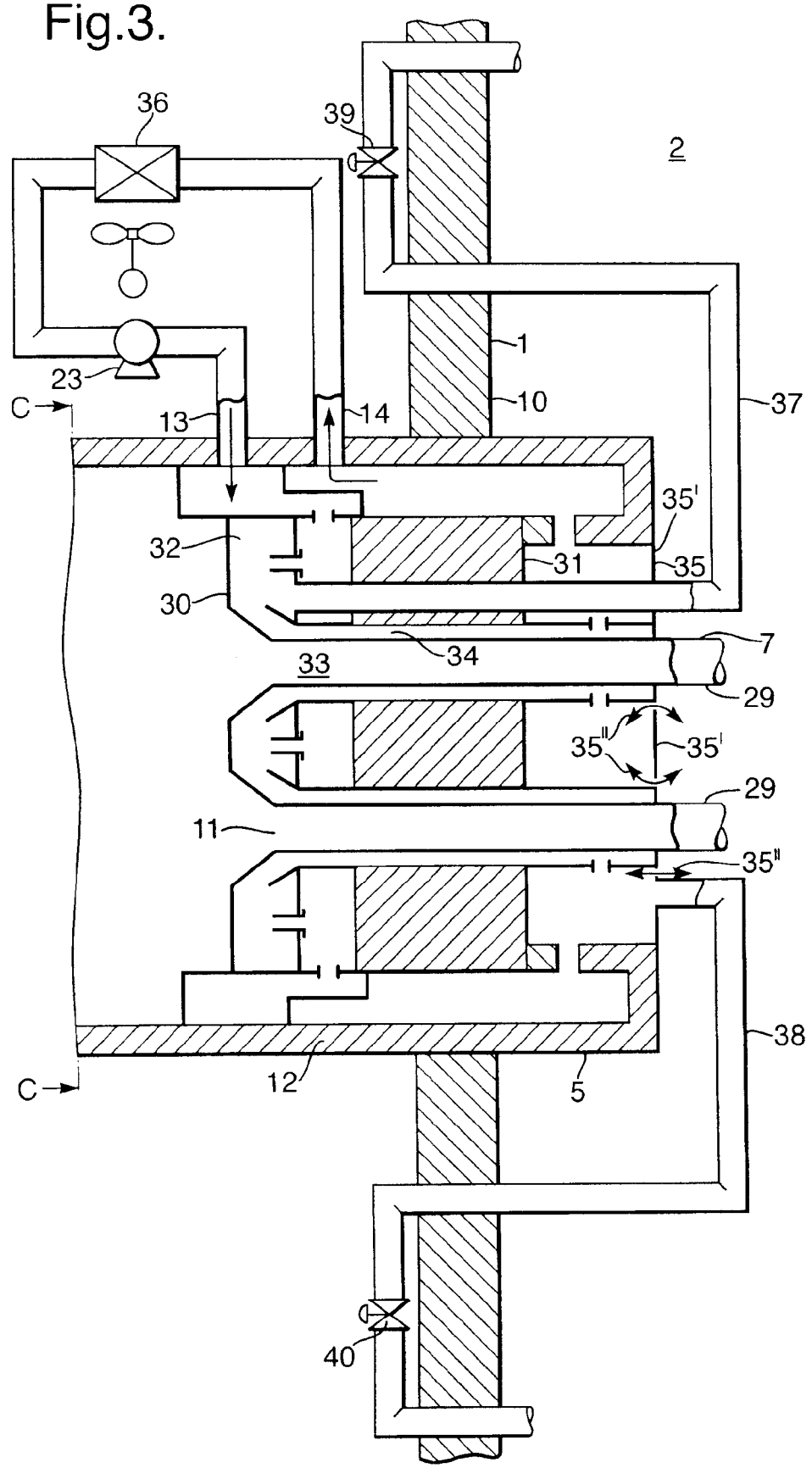
FIG. 3 illustrates a further preferred embodiment of the inlet section of the apparatus according to the invention.

FIG. 3 illustrates a preferred embodiment of the apparatus as shown in FIG. 2. One may imagine that when the second cooling medium fails to cool the tube plate sufficiently, damage may occur due to the high temperatures of the hot gas. Failure to sufficiently cool may be for example failure of pump (23). FIG. 3 shows an emergency vent conduit (37) having an inlet opening in front space (32) through which, in case of an emergency, evaporated cooling medium can be discharged from front space (32). Further, an emergency cooling medium supply conduit (38) is present through which, in case of an emergency, cooling medium can be supplied to used cooling medium compartment (35). In a more preferred embodiment the emergency vent conduit (37) is fluidly connected to coolant medium compartment (2). Preferably the emergency cooling medium supply conduit (38) is fluidly connected to the coolant medium compartment (2).

The invention is also directed to a method to avoid overheating of the upstream ends (11) of heat exchanger tubes (7) of an apparatus as shown in FIG. 3, wherein the flow of circulating cooling medium between heat exchanger (36) and front space (32) is measured and wherein in case of a measured flow lower than a predetermined minimal allowed flow for the circulating cooling medium the closed valves (39, 40) as present emergency vent conduit (37) and in the emergency cooling medium supply conduit (38) respectively are opened to allow evaporated cooling medium to leave front space (32) via vent conduit (37) and to allow cooling medium to enter used cooling medium space (35) via emergency cooling medium supply conduit (38) such that through an annular space (34) cooling medium flows counter-current to the hot gas as present in tubes (7).

Figure 4:
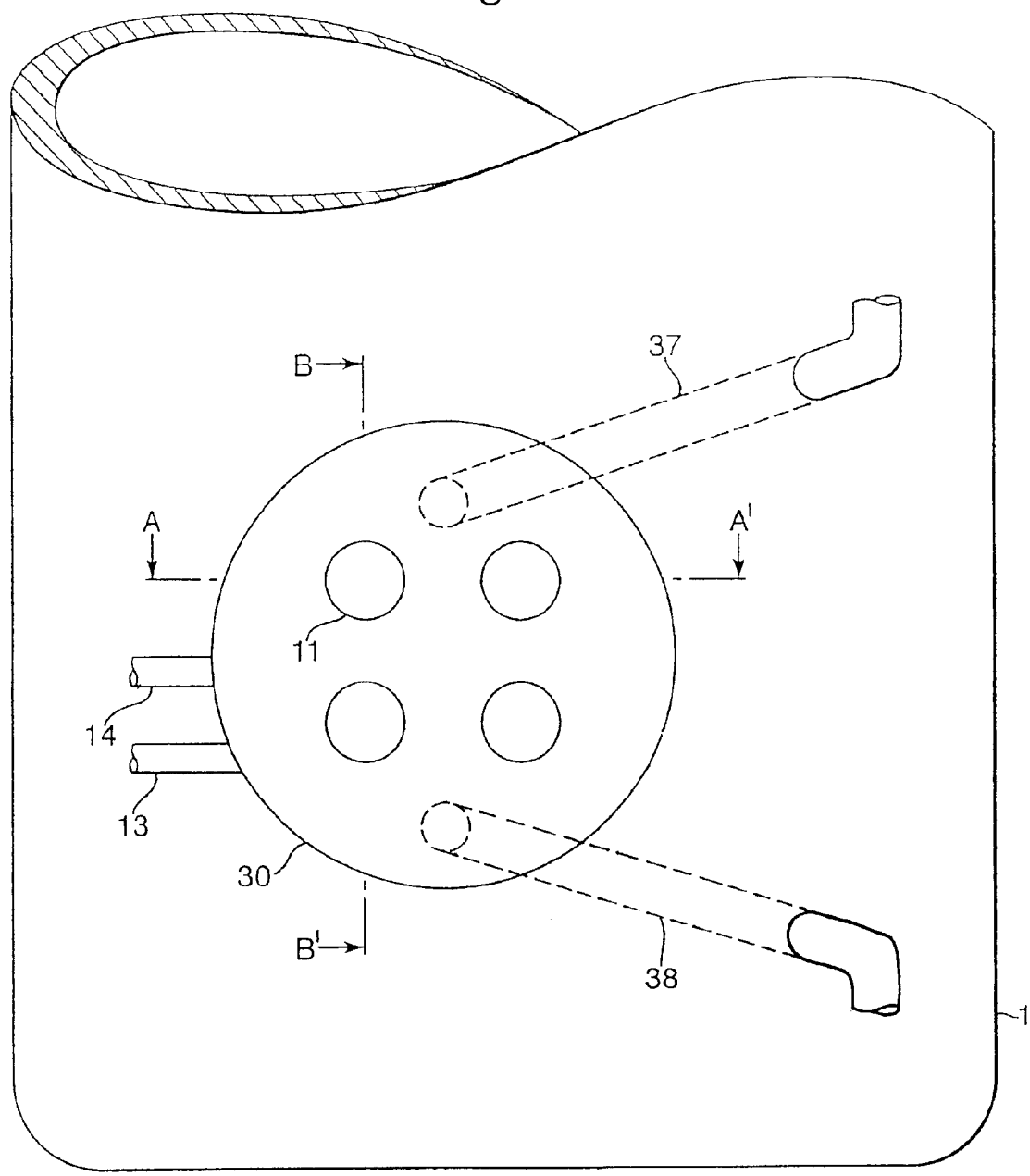
FIG. 4 is a cross-sectional view CC' of FIG. 3 illustrating a front view of the inlet section of FIG. 3.

FIG. 4 illustrates a section of the apparatus according to FIGS. 1 and 3 from cross-sectional view CC' as shown in FIG. 3. FIG. 4 shows an upwardly directed vent conduit (37) to allow easy discharge of evaporated cooling medium. Conduits (37) and (38) are in fluid communication with compartment (2) as shown in FIG. 3 at a more elevated position.

The invention is also directed to a process to prepare steam by indirect heat exchange between a hot gas and water wherein the following steps are performed
(i) steam is produced by indirect heat exchange between the hot gas which flows through a tube placed in a water bath,
(ii) fresh water is provided to the water bath, and
(iii) the upstream end of the tube is separately cooled by means of indirect heat exchange between a cooling medium and the hot gas flowing through the upstream end of the tube resulting in a used cooling medium having a temperature greater than the cooling medium, and
(iv) the used cooling medium of step (iii) is reduced in temperature and recycled to step (iii) and wherein the temperature of the cooling medium used in step (iii) is below the temperature of the fresh water added in step (ii).

Preferably the apparatus according to the present invention is used for the process to prepare steam, wherein the cooling medium as used in the process is the second cooling medium as in the description of the apparatus. Preferably the temperature of the hot gas entering the tube is between 700 and 1600° C., more preferably between 1000° C. and 1600° C. The pressure of the hot gas is suitably between 2 and 15 Mpa, preferably between 9 and 11 MPa. The cooled gas preferably has a temperature of below 600° C. and more preferably between 200 and 450° C.

The temperature of the cooling medium in step (iii) is between 50 and 200° C. Preferably the cooling medium in step (iii) is water. Preferably the temperature of the fresh water added in step (ii) is between 5 and 100° C. lower in temperature than the saturation temperature of water at the operating pressure of step (ii). Preferably the pressure of the steam as prepared is between 2 and 15 Mpa and more preferably between 4 and 15 Mpa. By being able to use relatively cool cooling medium in step (iii) an efficient cooling of the tube plate (12) may be achieved. By being able to add relatively hot fresh water to step (ii) more steam is produced at the same cooling capacity.

The hot gas may be any hot gas. Applicants have found that the apparatus and process is very suited to cool hot gasses comprising carbon monoxide and hydrogen and maintain the skin temperature of the surfaces of the apparatus, which comes into contact with the hot gas to a value of below 500° C. This is advantageous because exotic materials can thus be avoided and/or the process can be performed with such a hot gas comprising very little sulphur. Applicants found that the process may be performed with a hot gas comprising carbon monoxide and hydrogen and between 0 and 3% vol, more preferably between 0 and 100 ppmv sulphur, and even more preferably between 0 and 50 ppmv.

The invention is also directed to a process to prepare a mixture of carbon monoxide and hydrogen by means of a catalyzed or preferably non-catalyzed partial oxidation (POX) of a hydrocarbon feed or alternatively by means of an auto-thermal reforming step (ATR) of natural gas. The hot gas as prepared in such a process is then cooled according to the above-described process and preferably in the above described apparatus.

The hydrocarbon feed of a POX may be a gaseous fuel or a liquid fuel. Examples of possible feedstocks include natural gas, fractions obtained from (hydro-processed) tar sand sources and refinery streams such as middle distillates and more preferably fractions boiling above 370° C., such as those obtained in a vacuum distillation column. Examples are the vacuum distillates and the residue as obtained by a vacuum distillation of the 370° C. plus fraction as obtained when distilling a crude petroleum feedstock or when distilling the effluent of a carbon rejection process as performed in a refinery. Examples of carbon rejection processes are the well known fluid catalytic cracking (FCC) process, thermal cracking and the vis-breaking process. The hot gas as obtained in a gasification process will comprise mainly carbon monoxide and hydrogen.

A preferred feed for the POX is a gaseous hydrocarbon, suitably methane, natural gas, associated gas or a mixture of C1-4 hydrocarbons. Examples of gaseous hydrocarbons are natural gas, refinery gas, associated gas or (coal bed) methane and the like. The gaseous hydrocarbons suitably comprises mainly, i.e. more than 90 v/v %, especially more than 94%, $C_{1-4}$ hydrocarbons, especially comprises at least 60 v/v percent methane, preferably at least 75 percent, more preferably 90 percent. Preferably natural gas or associated gas is used.

The POX may be performed according to well known principles as for example described for the Shell Gasification Process in the Oil and Gas Journal, Sep. 6, 1971, pp 85-90. Publications describing examples of partial oxidation processes are EP-A-291111, WO-A-9722547, WO-A-9639354 and WO-A-9603345. In such processes the feed is contacted with an oxygen containing gas under partial oxidation conditions preferably in the absence of a catalyst.

The oxygen containing gas may be air (containing about 21 percent of oxygen) and preferably oxygen enriched air, suitably containing up to 100 percent of oxygen, preferably containing at least 60 volume percent oxygen, more preferably at least 80 volume percent oxygen, more preferably at least 98 volume percent of oxygen. Oxygen enriched air may be produced via cryogenic techniques, but is preferably produced by a membrane based process, e.g. the process as described in WO 93/06041.

Contacting the feed with the oxygen containing gas is preferably performed in a burner placed in a reactor vessel. To adjust the $H_2/CO$ ratio in the gaseous product obtained in the partial oxidation reaction, carbon dioxide and/or steam may be introduced into the feed. The gaseous product of the partial oxidation reaction preferably $H_2/CO$ molar ratio of from 1.5 up to 2.6, preferably from 1.6 up to 2.2.

The mixture of carbon monoxide and hydrogen as obtained by the above process may advantageously be used as feedstock for power generation, hydrogen manufacture, a Fischer-Tropsch synthesis process, methanol synthesis process, a dimethyl ether synthesis process, an acetic acid synthesis process, ammonia synthesis process or other processes which use a synthesis gas mixture as feed such as for example processes involving carbonylation and hydroformylation reactions.

Applicants found that the invention can be advantageously applied when preparing synthesis gas having a pressure of above 9 Mpa, especially between 9 and 15 Mpa. At this high pressure, the pressure of steam needs to increase as well to avoid a large pressure difference between the hot gas and the steam. It has been found advantageous to add fresh boiler water having a more elevated temperature separately to the water bath in order to achieve the higher steam pressures and use a relatively colder water to separately cool the upstream ends of the tubes. Using spent cooling water as fresh boiler feed water as in some prior art apparatuses would not have resulted in on the one hand sufficient cooling and on the other hand sufficient steam pressure.

The invention is therefore also directed to a process to prepare synthesis gas having the pressure of above 8 Mpa and preferably between 9 to 15 Mpa and a temperature of above 1000° C., more preferably between 1000° C. and 1600° C. by performing the following steps:
(a) partial oxidation of (hydro)carbon-containing fuel to obtain synthesis gas of said pressure and temperature
(b) cooling against evaporating water by passing a hot gas through a conduit present in the water bath wherein the upstream end of said conduit is cooled by a closed water cooling circuit by indirect heat exchange against water having temperature preferably below 100° C. and wherein the makeup water having a temperature preferably above 200° C. is separately added to the water bath.

What is claimed is:

1. An apparatus for cooling hot gas comprising:
   (i) a vertical elongated vessel provided with a cooling medium compartment comprising in use a first cooling medium, an inlet to supply fresh first cooling medium and an outlet for discharge of used first cooling medium, said vessel further provided with an inlet for hot gas and an outlet for cooled gas, at least one heat exchange tube, which heat exchange tube is positioned in the cooling medium compartment and fluidly connects the inlet for hot gas and the outlet for cooled gas,
   (ii) said cooling medium compartment further comprising a vertical and centrally positioned open ended downcomer wherein said heat exchange tube is positioned in a space between the downcomer and the vessel wall,
   (iii) and wherein the heat exchanger tube is mounted at its upstream end in a tube plate and wherein the tube plate is provided with means to supply a second cooling medium to the exterior of the upstream end of the heat exchanger tube, means to discharge the used second cooling medium, means to reduce the temperature of the used second cooling medium and means to recycle the second cooling medium to the exterior of the upstream end of the heat exchanger tube.

2. An apparatus according to claim 1 wherein the inlet for supplying fresh first cooling medium is positioned such that the direction of the inlet flow of fresh first cooling medium enhances, in use, a downwards flow of first cooling medium through the interior of the downcomer.

3. An apparatus according to claim 2, wherein the inlet is directed downwards and is positioned in the upper half of the downcomer.

4. A process to prepare steam by indirect heat exchange between a hot gas and water comprising:
   (i) producing steam by indirect heat exchange between a hot gas which flows through a tube placed in a water bath,
   (ii) providing fresh water to the water bath, and
   (iii) separately cooling the upstream end of the tube by means of indirect heat exchange between a cooling medium and the hot gas flowing through the upstream end of the tube resulting in a used cooling medium having a temperature greater than the cooling medium, and
   (iv) reducing the temperature of the used cooling medium of step (iii) and recycling the cooling medium to step (iii) and wherein the temperature of the cooling medium used in step (iii) is below the temperature of the fresh water added in step (ii).

5. A process according to claim 4, wherein the temperature of the hot gas entering the tube is between 700 and 1600° C. and wherein the temperature of the cooling medium in step (iii) is between 50 and 200° C.

6. A process according to claim 4, wherein the temperature of the fresh water added in step (ii) is between 5 and 100° C. lower in temperature than the saturation temperature of water at the operating pressure of step (ii).

7. A process according to claim 4, wherein the pressure of the steam as prepared is between 2 and 15 Mpa.

8. A process according to claim 4, wherein the hot gas comprises carbon monoxide, hydrogen and between 0 and 3% vol sulphur and wherein the wall of the upstream end of the tube is maintained in step (iii) at a temperature of below 500° C.

9. An apparatus for cooling a hot gaseous medium comprising: a vessel wherein a bundle of tubes are disposed in a coolant medium compartment and wherein in use a liquid coolant medium flows around the tube bundle;
   wherein said tubes are mounted at their upstream ends in a thermal shield, said tubes further extending through a support plate mounted at a distance from the thermal shield defining a front space between the thermal shield and the support plate means to add liquid coolant to the front space;
   wherein the openings in the support plate are larger than the tubes thereby defining an annular space between tube and support plate, which annular space fluidly connects the front space with a used cooling medium compartment such that in use liquid coolant can flow co-current with the hot gaseous medium in the tubes from the front space to said used cooling medium compartment; and
   means to discharge the cooling medium from the used cooling medium compartment to a heat exchanger positioned external to the vessel which in use reduces the temperature of the used cooling medium, which heat exchanger is fluidly connected to the means to recycle coolant to front space such that, in use, cooling medium can circulate between heat exchanger and front space.

10. An apparatus according to claim 9, further comprising an emergency vent conduit having an inlet opening in the front space through which, in case of an emergency, evaporated cooling medium can be discharged from the front space and an emergency cooling medium supply conduit through which, in case of an emergency, cooling medium can be supplied to used cooling medium compartment.

11. An apparatus according to claim 10, wherein the emergency vent conduit is fluidly connected to coolant medium compartment.

12. An apparatus according to claim 10, wherein the emergency cooling medium supply conduit is fluidly connected to the coolant medium compartment.

13. A method to avoid overheating of the upstream ends of heat exchanger tubes of an apparatus according to claim 10, wherein the flow of circulating cooling medium between the heat exchanger and the front space is measured and wherein in case of a measured flow lower than a predetermined minimal allowed flow for the circulating cooling medium closed valves present in the emergency vent conduit and in the emergency cooling medium supply conduit respectively are opened to allow evaporated cooling medium to leave front space via vent conduit and to allow cooling medium to enter used cooling medium space via emergency cooling medium supply conduit such that through an annular space cooling medium flows counter-current to the hot gas as present in tubes.

* * * * *